US011580509B2

(12) United States Patent
Sylvester et al.

(10) Patent No.: US 11,580,509 B2
(45) Date of Patent: Feb. 14, 2023

(54) TRANSACTION DEVICE, COMPUTER PROGRAM AND TRANSACTION METHOD

(71) Applicant: MASTERCARD INTERNATIONAL INCORPORATED, Purchase, NY (US)

(72) Inventors: Dave Sylvester, Brentwood (GB); John Beric, London (GB); James David Sinton, Leigh-On-Sea (GB); Duncan Garrett, London (GB); David Anthony Roberts, Warrington (GB); Emil Johan Sjoberg, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 114 days.

(21) Appl. No.: 16/440,060

(22) Filed: Jun. 13, 2019

(65) Prior Publication Data
US 2019/0385135 A1   Dec. 19, 2019

(30) Foreign Application Priority Data
Jun. 14, 2018 (EP) .................................. 18177819

(51) Int. Cl.
*G06Q 20/10* (2012.01)
*G06Q 20/06* (2012.01)
*G06Q 20/36* (2012.01)
(52) U.S. Cl.
CPC ....... *G06Q 20/105* (2013.01); *G06Q 20/0658* (2013.01); *G06Q 20/3676* (2013.01); *G06Q 20/3678* (2013.01)

(58) Field of Classification Search
CPC ............. G06Q 20/105; G06Q 20/0658; G06Q 20/3676; G06Q 20/3678
See application file for complete search history.

(56) References Cited

U.S. PATENT DOCUMENTS

| | | | | |
|---|---|---|---|---|
| 5,202,984 A | * | 4/1993 | Kashio ................... | G06Q 40/02 |
| 6,112,984 A | * | 9/2000 | Snavely .................. | G07G 1/14 |
| | | | | 340/5.4 |
| 10,354,303 B1 | * | 7/2019 | Ran ..................... | G06Q 30/0609 |
| 2002/0100808 A1 | * | 8/2002 | Norwood ............. | G06Q 20/341 |
| | | | | 235/486 |

(Continued)

OTHER PUBLICATIONS

Eftlabs.com, "Complete list of EMV & NFC tags", https://web.archive.org/web/20160307111644/http://www.eftlab.com:80/index.php/site-map/knowledge-base/145-emv-nfc-tags (Year: 2016).*

(Continued)

*Primary Examiner* — Ryan D Donlon
*Assistant Examiner* — Mark A Malkowski
(74) *Attorney, Agent, or Firm* — Talem IP Law, LLP

(57) ABSTRACT

A transaction device is described. The device comprises storage configured to store a first data record comprising first value data and a unique identifier associated with one other device; communications circuitry configured to receive an identifier and second value data from a device; and control circuitry configured to compare the received identifier with the unique identifier and in the event of a positive comparison, the control circuitry is further configured to update the stored first value data in accordance with the exchanged second value data.

17 Claims, 7 Drawing Sheets

(56) References Cited

U.S. PATENT DOCUMENTS

| | | | | |
|---|---|---|---|---|
| 2004/0141601 A1* | 7/2004 | Cai | ................ | G06Q 20/12 700/35 |
| 2011/0066550 A1 | 3/2011 | Shank et al. | | |
| 2012/0011062 A1 | 1/2012 | Baker et al. | | |
| 2013/0018738 A1* | 1/2013 | Faires | ................ | G06Q 20/381 705/16 |
| 2013/0185167 A1* | 7/2013 | Mestre | ................ | G07F 7/127 705/21 |
| 2014/0372300 A1* | 12/2014 | Blythe | ................ | G06Q 20/3676 705/41 |
| 2015/0026049 A1* | 1/2015 | Theurer | ................ | G06Q 20/28 705/41 |
| 2015/0112860 A1 | 4/2015 | Wang et al. | | |
| 2015/0327071 A1* | 11/2015 | Sharma | ................ | H04W 12/12 726/6 |
| 2015/0348018 A1* | 12/2015 | Campos | ................ | G06Q 20/3278 705/41 |
| 2016/0110696 A1* | 4/2016 | Angus | ................ | G06Q 20/108 705/39 |
| 2016/0155117 A1 | 6/2016 | Badenhorst | | |
| 2017/0103237 A1 | 4/2017 | Roehrle et al. | | |
| 2017/0169403 A1 | 6/2017 | Zhang | | |
| 2017/0243202 A1* | 8/2017 | Everett | ................ | G06Q 20/3674 |
| 2019/0005488 A1* | 1/2019 | Dietrich | ................ | G06Q 20/3572 |
| 2019/0197577 A1* | 6/2019 | Rhee | ................ | G06Q 20/023 |

OTHER PUBLICATIONS

Wells Fargo, "Wells Fargo EasyPay Card", https://web.archive.org/web/20180601140015/https://www.wellsfargo.com/prepaid/faq/ (Year: 2018).*

Nayak, "A Credit Card Primer"—https://emicalculator.net/a-credit-card-primer/ pub. Sep. 2014 (Year: 2014).*

International Search Report and Written Opinion Issued in International Application No. PCT/US2019/028677, dated Sep. 18, 2019, 12 pages.

"EMV", https://en.wikipedia.org/w/index.php?title=EMV&oldid=845664769, Accessed Nov. 9, 2018, 19 pages.

* cited by examiner

TRANSACTION DEVICE, COMPUTER PROGRAM AND TRANSACTION METHOD

TECHNICAL FIELD

The present technique relates to a transaction device, computer program and transaction method.

BACKGROUND

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

With the reduction in size and power consumption of integrated circuits, smart cards are becoming more prevalent. Smart cards are electronic devices which typically store data securely and which have a card-shaped form factor. These devices are arranged to communicate this data securely with a card reading device. In some instances, the smart card device may also be arranged to communicate with a different smart card device either directly or via the card reading device. Embodiments of the disclosure relate to smart card devices, the data stored on the smart card device and the mechanism by which this data is communicated to another smart card device.

Embodiments of the disclosure particularly relate, although not exclusively, to smart cards used in transactions. Specifically, in remote areas where electricity connectivity and internet connectivity is intermittent, there is a need to allow transactions to take place using the smart cards.

Current systems require a reliable network connection and electricity system to function. This is especially the case where a credit is provided to a customer where typically credit checks, accounting for the credit transactions and the like are carried out over the network by remote computer systems. It is an aim of the present disclosure to reduce this reliance on a reliable network connection and electricity system.

BRIEF SUMMARY

In embodiments, there is provided a transaction device comprising storage configured to store a first data record that comprises first value data and a unique identifier associated with one other device; communications circuitry configured to communicate with a second device and to exchange an identifier and second value data from the second device; and control circuitry configured to compare the exchanged identifier with the unique identifier associated with the one other device and in the event of a positive comparison, the control circuitry is further configured to update the stored first value data in accordance with the exchanged second value data.

This provides transactions to occur between devices where there is no communications infrastructure.

The first value data may be a value of credit extended to the device from the other device uniquely associated therewith. This allows the devices to be used to provide credit to consumers where previously credit was not possible without complex infrastructure.

The storage may be configured to store a plurality of data records with each data record being uniquely associated with a different device. This allows efficient searching through the storage to take place.

The storage may be further configured to store a plurality of value pocket records, each value pocket record being uniquely associated with a different currency, wherein one value pocket record is associated with the stored first data record, the first data record being associated with that currency. In one non-limiting example, the one value pocket record contains a memory pointer to the stored first data record.

The value pocket record may include a currency value indicating an amount of the currency stored in the storage, whereby in the event that the currency value in the value pocket record is zero and no first data record is associated with the value pocket record, the control circuitry is configured to delete the value pocket record from the storage. This ensures that the storage is efficiently used. In one non-limiting example, the no first data record is that the memory pointer to the stored first data record is zero.

In the event that the updated stored first value data is zero, the control circuitry may be configured to delete the first data record from the storage. This ensures that the storage is efficiently used.

The first data record may be of the structure

| Variable | Number of Bytes |
|---|---|
| Counterparty PID | 8 |
| Counterparty Narrative | 12 |
| Balance (signed (+/−)) | 6 |
| Pointer to Next data Record (0000 if this data record is the end of the list) | 2 |
| Checksum | 4 |
| Total | 32 | wherein the: Counterparty PID is the purse identifier of the other party's purse involved in the transaction. Counterparty Narrative is the purse narrative of the other party's purse involved in the transaction. Balance is a positive or negative value. This is a running total of the amount of credit extended to the device by the other device. Pointer to Next data Record is a memory address value where the next data record is stored; and Checksum is a value to detect an error within the data record.

Corresponding method and computer program embodiments are envisaged. These are defined in the claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
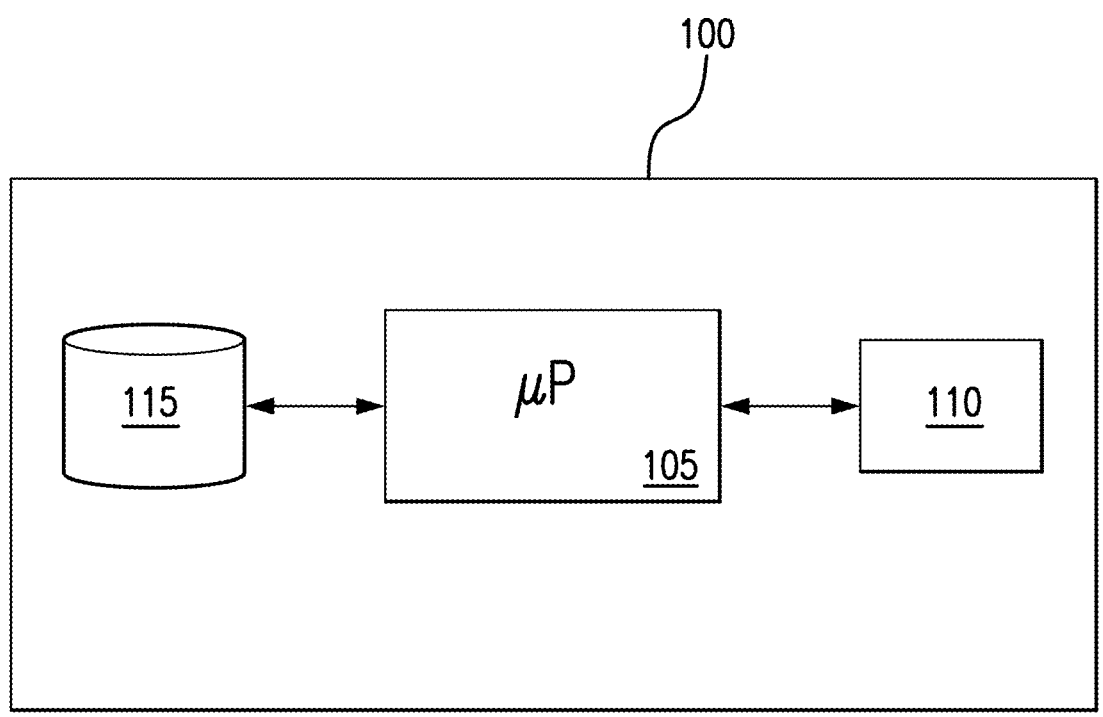
FIG. 1 shows a cardholder device 100 according to embodiments of the present disclosure.

Referring now to the drawings, wherein like reference numerals designate identical or corresponding parts throughout the several views.

FIG. 1 shows a cardholder device 100 according to embodiments of the present disclosure. The cardholder device 100 is, in embodiments, a smart card type device. Other example embodiments include smart phones, tablet computers, wearable devices such as watches and the like.

The cardholder device 100 comprises cardholder control circuitry 105 and cardholder communications circuitry 110. In embodiments, the cardholder communications circuitry 110 is configured to communicate with another device under the control of the cardholder control circuitry 105. This communication may use contactless technology such as EMV technology. This means that the cardholder communications circuitry 110 will communicate with another device wirelessly by being in close proximity to the other device. In order to communicate in this manner, the cardholder communications circuitry 110 will communicate using the ISO/IEC 14443 and ISO/IEC 7816 Standards. Of course, although EMV is one contactless technology, other technologies such as Near Field Communication exists. Therefore, the disclosure is not so limited.

In other embodiments, the communications circuitry 110 may require the cardholder device 100 to be in physical contact with another device to enable such communication to occur. In order to communicate in this manner, the cardholder communications circuitry 110 will communicate using the ISO/IEC 7816 Standard.

The cardholder control circuitry 105 is a processor that operates under the control of computer software. For example, the cardholder control circuitry 105 is a microprocessor that operates under the control of software stored within cardholder storage 115. The cardholder control circuitry 105 may therefore be constructed from semiconductor material and may be embodied as a microprocessor. Cardholder storage 115 therefore, in embodiments, contains computer readable software that configures the cardholder control circuitry 105 to perform certain methods within the embodiments of the disclosure.

In addition, the cardholder storage 115 contains data structures used by the cardholder control circuitry 105 to store information about the user. Further, the cardholder storage 115 may contain data that is equivalent to money so that the cardholder device 100 may be used as electronic cash. The cardholder device 100 may be therefore used to purchase goods and services from a merchant.

Figure 2:
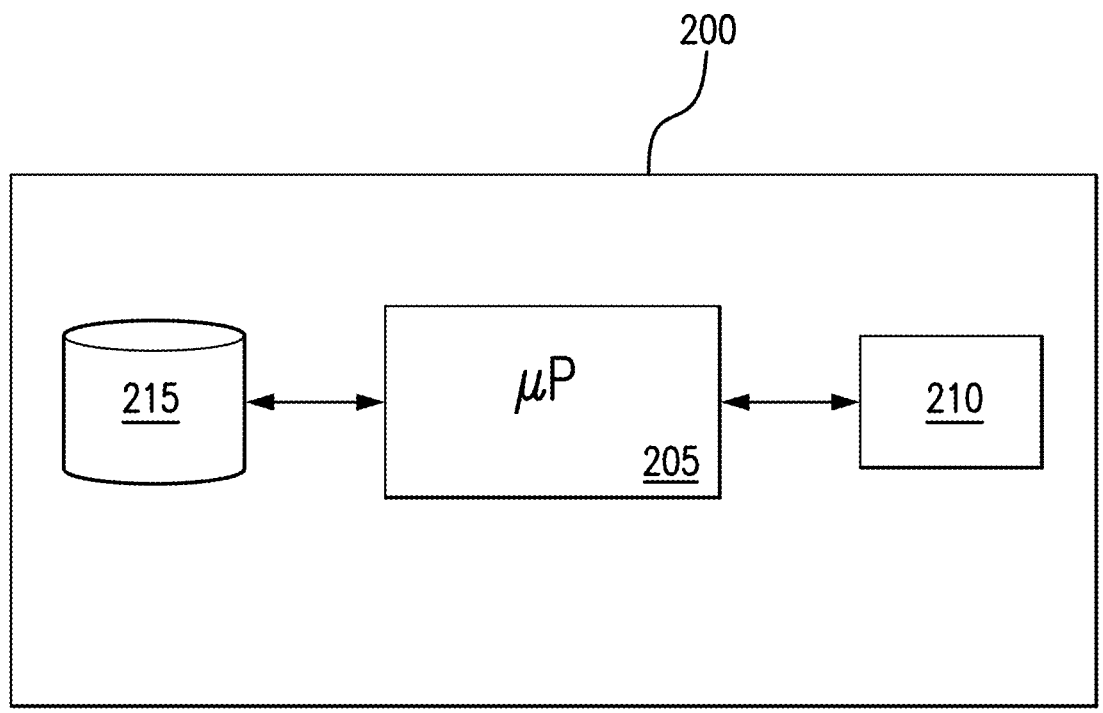
FIG. 2 shows a merchant device 200 according to embodiments of the present disclosure.

FIG. 2 shows a merchant device 200 according to embodiments of the disclosure. The merchant device 200 is, in embodiments, a smart card type device.

In a similar manner to the cardholder device 100, the merchant device 200 comprises merchant control circuitry 205 and merchant communications circuitry 210. In embodiments, the merchant communications circuitry 210 is configured to communicate with another device under the control of the merchant control circuitry 205. This communication may use contactless technology such as EMV technology. This means that the merchant communications circuitry 210 will communicate with another device wirelessly by being in close proximity to the other device. In order to communicate in this manner, the merchant communications circuitry 210 will communicate using the ISO/IEC 14443 and ISO/IEC 7816 Standards. Of course, although EMV is one contactless technology, other technologies such as Near Field Communication exists. Therefore, the disclosure is not so limited.

In other embodiments, the merchant communications circuitry 210 may require the merchant device 200 to be in physical contact with another device to enable such communication to occur. In order to communicate in this manner, the merchant communications circuitry 210 will communicate using the ISO/IEC 7816 Standard.

Like the description of FIG. 1, the merchant control circuitry 205 is a processor that operates under the control of computer software. For example, the merchant control circuitry 205 is a microprocessor that operates under the control of software stored within merchant storage 215. The merchant control circuitry 205 may therefore be constructed from semiconductor material and may be embodied as a microprocessor. Merchant storage 215 therefore, in embodiments, contains computer readable software that configures the merchant control circuitry 205 to perform certain methods within the embodiments of the disclosure.

In addition, the merchant storage 215 contains data structures used by the merchant control circuitry 205 to store information about the user. Further, the merchant storage 215 may contain data that is equivalent to money so that the merchant device 200 may be used as a device to transact using electronic cash. The merchant device 200 may be therefore used to transact with a user of the cardholder device 100 of FIG. 1. The cardholder device 100 and the merchant device 200 may be embodied as smartphone devices, tablet computer, wearable technology such as a watch, or any form factor that allows it to operate as a contactless transaction device.

Figure 3:
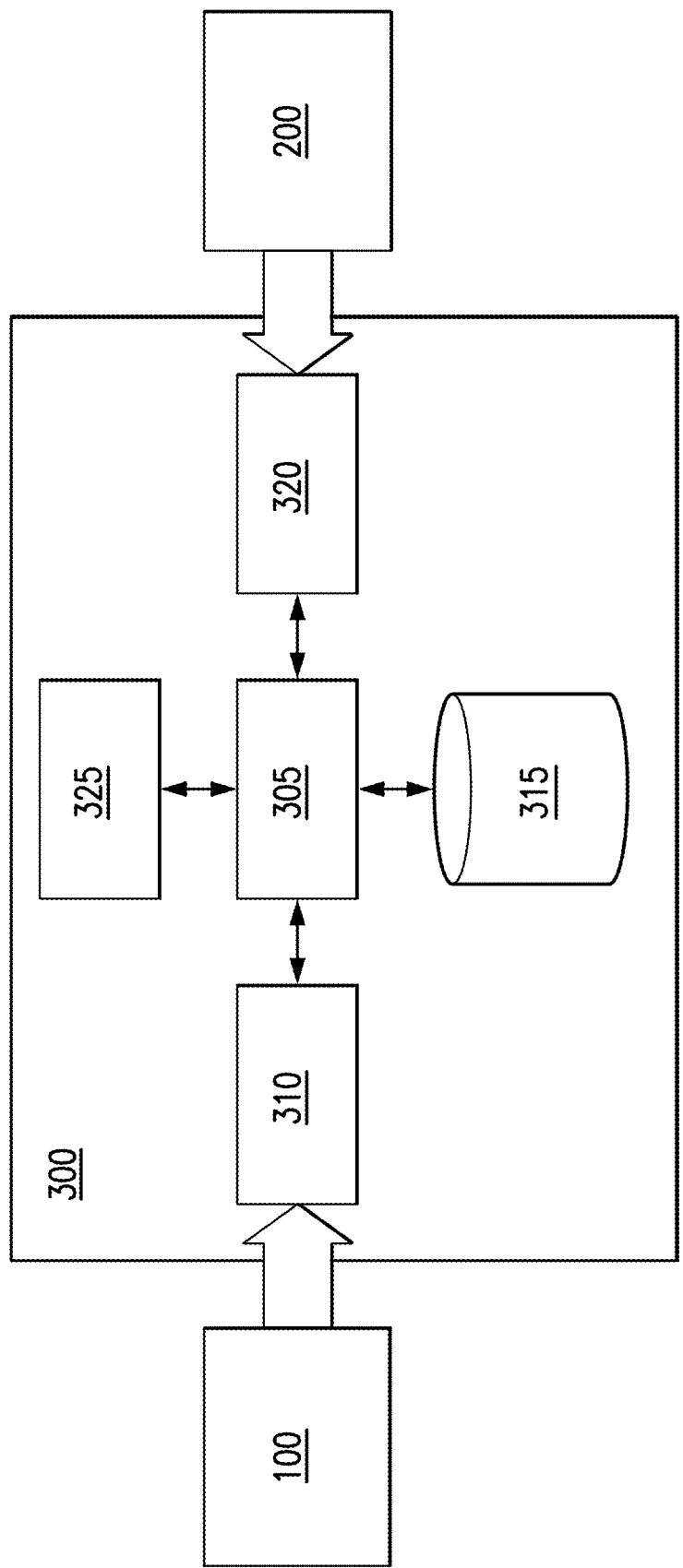
FIG. 3 shows an interface device 300 according to embodiments of the present disclosure.

FIG. 3 shows an interface device 300 which is used, in embodiments, to transfer data between the cardholder device 100 of FIG. 1 and the merchant device 200 of FIG. 2. In particular, the interface device 300 of FIG. 3 has, in embodiments, a first receptacle 310 to receive the cardholder device 100 and a second receptacle 320 to receive the merchant device 200. The receptacles may be slots in which the smart cards are inserted. Alternatively, the first and second receptacles may be a contactless pad over which the cardholder device 100 and the merchant device 200 are held. The disclosure is not limited to any particular kind of receptacle.

FIG. 3 shows a cardholder device 100 and merchant device 200 being placed into the first receptacle and the second receptacle respectively.

Additionally, the interface device 300 includes interface control circuitry 305. This is a processor that operates under the control of computer software. For example, the interface control circuitry 305 is a microprocessor that operates under the control of software stored within interface storage 315. The interface control circuitry 305 may therefore be constructed from semiconductor material and may be embodied as a microprocessor. Interface storage 315 therefore, in embodiments, contains computer readable software that configures the interface control circuitry 305 to perform certain methods within the embodiments of the disclosure.

It should be noted here that the interface device 300 may include a connection to a network. This connection may be a Local Area Network, a Cellular Network or a Wide Area Network, such as the Internet. In addition, the interface device 300 may be connected to the electricity grid within a locality.

However, in embodiments, the interface device 300 does not include a connection to a communications network or the interface device 300 may be connected to a communications network which has sporadic connectivity. This means that, in embodiments, the interface device 300 does not rely on a network in order to allow the cardholder device 100 and the merchant device 200 to directly communicate with one another and to exchange data. In other words, the interface device 300 allows the cardholder device 100 and the merchant device 200 to directly communicate with one another without the use of a communication network. This allows the interface device 300 to be used in remote areas with little or no network connectivity.

In addition, the interface device 300 may be battery powered or powered by a local electricity source such as solar panels or a winding mechanism. In this case, a connection to a reliable mains power grid, or indeed an electricity grid at all is not necessary. This allows the interface device 300 to be used in remote areas with little or no electricity infrastructure.

This means that unlike known electronic transaction devices and systems, the cardholder device 100, the merchant device 200 and the interface device 300 according to embodiments of the present disclosure may be used in areas with no or limited network connectivity and/or with little or no access to the electricity grid. This feature of embodiments of the present disclosure therefore allows the flexibility of electronic monetary transactions without requiring a reliable infrastructure. Accordingly, embodiments of the disclosure aim to provide electronic monetary transaction and credit provision without connection to large amounts of infrastructure.

The interface device 300 also comprises a user interface 325. This user interface 325 may incorporate a display and a touch screen or physical keyboard allowing data to be input by a user.

Figure 4A:
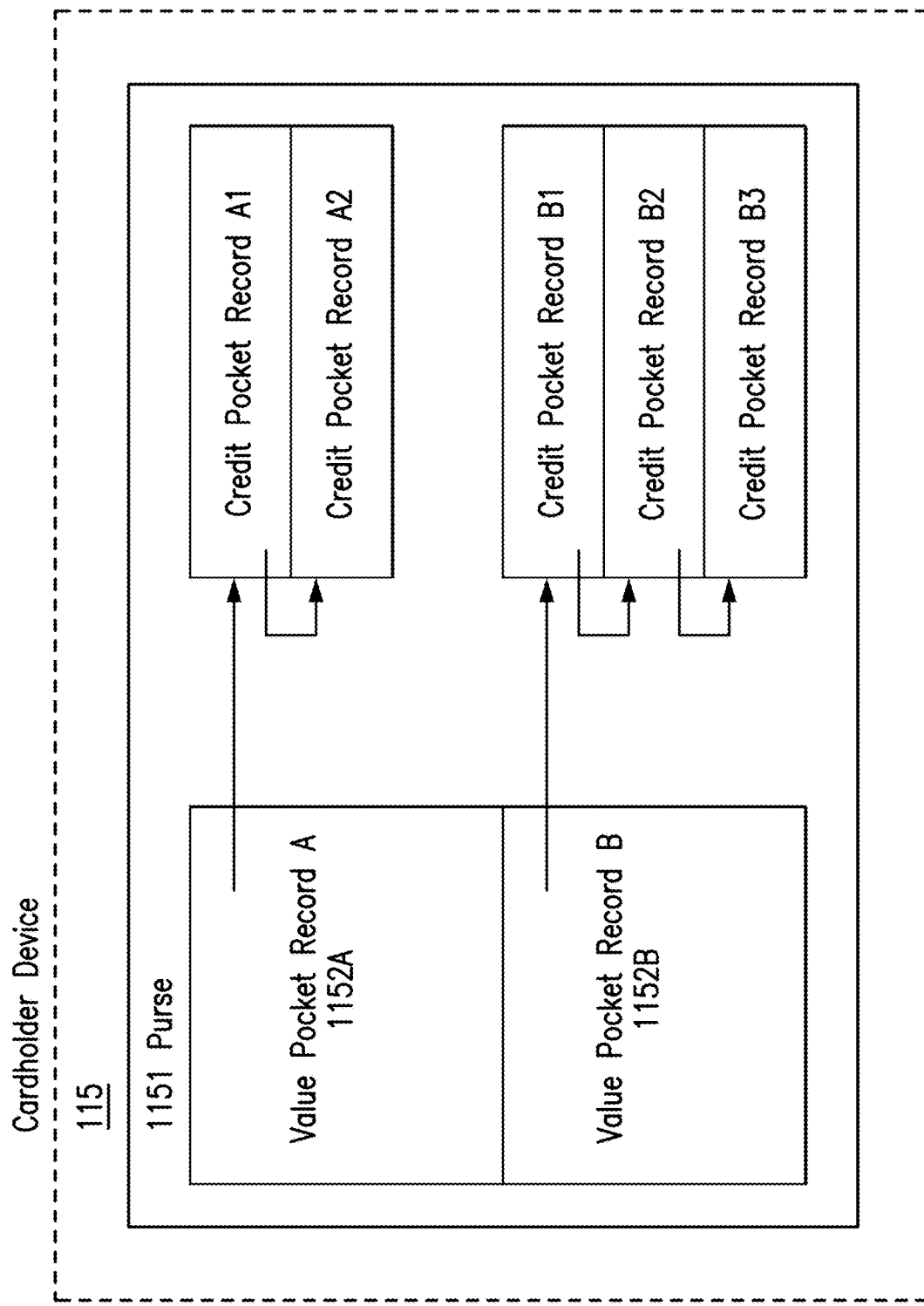
FIG. 4A shows a data structure stored within the cardholder device 100 according to embodiments of the present disclosure.

FIG. 4A shows a data structure stored within cardholder storage 115 according to embodiments. In embodiments the data structure includes a purse 1151. A purse is an application stored on the cardholder device 100. The application may be software run on a computer processor or may be a hardware implementation using dedicated hardware such as an Application Specific Integrated Circuit (ASIC).

Purse

The purse contains various parameters. These parameters include parameters used to uniquely identify the purse, the user of the purse, the currencies which may be stored on the purse or the like. Each purse may include:

Purse identifier (PID) which is a unique identity code for the purse application on the cardholder device 100. The PID also includes the identifier of the purse provider.

Narrative which is text that describes the purse holder.

Purse class which is a code indicating the class of the purse.

Currency details which includes a balance; a currency symbol; ISO currency code; the number of decimal places used for the currency; the value limit ceiling, which is the maximum value the purse is ever able to hold in this currency; the value limit which is the maximum value that can currently be held in this currency on the purse; and the class list which indicates the classes of purse to which a purse can transfer value. These are defined in the Value Pocket Record as described below.

Default pocket which is one value pocket record assigned a currency set up as a default.

Personal code attempts permitted which is the number of consecutive incorrect personal code entries before the purse becomes locked out.

Other data values that can be changed dynamically include:

Sequence number which protects transactions. The sequence number is unique for each protected transaction in the lifetime of the purse.

Personal code which is a user-defined personal code used to unlock the purse.

Personal code attempts which is the count of the number of incorrect attempts made by a cardholder to supply a personal code since a correct code was entered.

Locking state which indicates whether the purse has a personal code and whether the purse is non-locking, locked, unlocked or locked out.

Pending exception flag which indicates, when the flag is set, that the purse did not complete its last payment. If this payment is not resumed, the failed payment will be added to the exception log when a new payment is started.

Number of unused exceptions which, in conjunction with the pending exception flag, can be used to determine how much free space remains in the exception log memory area.

Payment recovery flag which is used when deciding whether a purse can take part in the recovery of its last payment.

Of course, other parameters may also be included in an electronic purse and these parameters are not included for brevity and clarity. An electronic purse is known in the art and so will not be described in any detail.

Each currency within the purse is stored within a value pocket record. In the example embodiment of FIG. 4A, there are two value pocket records; Value Pocket Record A 1152A and Value Pocket Record B 1152B.

A value pocket record is created for each currency. This means that each value pocket record is uniquely associated with a different currency. So, in the example embodiment of FIG. 4A, Value Pocket Record A 1152A is a value pocket record containing US Dollars and Value Pocket Record B is a value pocket record containing Kenyan Shillings. In embodiments of the disclosure, these value pocket records are called value pocket records, pocket records or pockets.

Typically, for each currency, where monetary value is added or removed from a value pocket record (i.e. debited from and credited to a value pocket record), only a running total of the amount of currency left in the value pocket record is required. This is because value may be only added and removed from the value pocket record.

However, where a merchant extends a credit facility to a cardholder to purchase goods, it is not possible to simply maintain a running value total since credit of this type is not recognised as value by other actors in the system. This is because each different cardholder utilising a credit facility will have differing amounts of their credit facility used necessarily linked to specific identified merchants who have extended this credit. Each different cardholder will also wish to pay back all or part of the credit facility at differing times. Accordingly, the pocket record structure needs to be adapted.

In embodiments shown in FIG. 4A, associated with each value pocket record are credit pocket records. That is, associated with each value pocket record are first and second data records. Specifically, in the example of FIG. 4A, two credit pocket records (Credit Pocket Record A1 and Credit Pocket Record A2) are associated with Value Pocket Record A 1152A and three credit pocket records (Credit Pocket Record B 1, Credit Pocket Record B2 and Credit Pocket Record B3) are associated with Value Pocket Record B 1152B.

This means that the cardholder device 100 has two credit facilities in US Dollars and three credit facilities in Kenyan Shillings.

Of course, the disclosure is not so limited and there may be any number of value pocket records, currencies and credit pocket records, including zero credit pocket records.

As mentioned above, the purse includes a default pocket. Therefore, when the cardholder device 100 is used, Value Pocket Record A 1152A will be accessed. Of course, any value pocket record within the purse may be the default pocket and Value Pocket Record A has been selected for illustrative purposes only.

The structure of a value pocket record (such as Value Pocket Record A) is provided below:

Value Pocket Record

| Variable | Number of Bytes |
| --- | --- |
| Balance | 6 |
| Currency Symbol | 4 |
| ISO Currency Code | 3 |
| Minor Places, which is the number of decimal places used for a currency | 1 |
| Value Limit Ceiling | 6 |
| Value Limit | 6 |
| Class List | 2 |
| Class List Ceiling | 2 |
| Total Credit Received Balance | 6 |
| Total Credit Provided Balance | 6 |
| Pointer to First Credit Pocket Record (0000 if no credit pocket records currently associated with this value pocket record) | 2 |

In the value pocket record, the final three variables "Total Credit Received Balance", "Total Credit Provided Balance" and "Pointer to First Credit Pocket Record" are included to provide a credit facility. Specifically, the "Total Credit Received Balance" is the sum of the credit pocket records where credit has been provided to this purse. In other words, the "Total Credit Received Balance" is the total amount of credit facility that has been extended to the cardholder device 100. This will be a sum of the absolute value of the "balance" variable of all the credit pocket records associated with a value pocket record where the "balance" is negative. Similarly, the "Total Credit Provided Balance" is the sum of the credit pocket records where credit has been provided by this purse. In other words, the "Total Credit Provided Balance" is the total amount of credit facility that has been provided by the cardholder device 100. This will be a sum of the "balance" variable of all the credit pocket records associated with a value pocket record where the "balance" is positive. Note that although typically credit would be received by a cardholder device 100 and provided by a merchant device 200 the mechanism is flexible and in some embodiments credit could also be provided by a cardholder device 100 to either another cardholder device 100 or a merchant device 200. Storing the Total Credit Received Balance and Total Credit Provided Balance in the value pocket record and updating them when a credit transaction is performed allows these totals to be efficiently reported by the purse when requested.

In addition, the "Pointer to First Credit Pocket Record" provides the memory address of the first credit pocket record. In the embodiments of FIG. 4A, for example, the "Pointer to First Credit Pocket Record" of Value Pocket Record A will be the physical memory address of Credit Pocket Record A1. In the event that no credit facility has been extended to, or provided by, the cardholder device 100, the "Pointer to First Credit Pocket Record" will be set to 0000. It is advantageous to provide the "Pointer to First Credit Pocket Record" in the value pocket record because the device can access the Value Pocket Record as a default and can quickly establish whether any credit pocket records have been created for this currency but there are a variety of alternative memory/data management techniques to obtain the desired effects of correctly recording credit and currency of which this is an example.

The structure of a credit pocket record (e.g. either Credit Pocket Record A1 or Credit Pocket Record A2 for Value Pocket Record A) is provided below:

Credit Pocket Record

| Variable | Number of Bytes |
| --- | --- |
| Counterparty PID | 8 |
| Counterparty Narrative | 12 |
| Balance (signed (+/−)) | 6 |
| Pointer to Next Credit Pocket Record (0000 if this credit pocket record is the end of the list) | 2 |
| Checksum | 4 |
| Total | 32 |

In the above structure of the credit pocket record, the:

Counterparty PID is the purse identifier of the other party's purse involved in the transaction. So, in the example described above, the counterparty PID stored in the credit pocket record for the cardholder device 100 is the purse identifier of the merchant device 200.

Counterparty Narrative is the purse narrative of the other party's purse involved in the transaction. So, in the example described above, the counterparty narrative stored in the credit pocket record for the cardholder device 100 is the narrative of the purse stored within the merchant device 200.

Balance is a positive or negative value. This is a running total of the amount of credit extended to the cardholder device 100 for this counterparty purse and reflects the reconciliation of all amounts borrowed and paid back to date.

Pointer to Next Credit Pocket Record is a physical memory address value where the next credit pocket record is stored. In other words, this is a memory pointer to a second data record that is uniquely associated with a different device. In the event that the credit pocket record is the last credit pocket record, this value is 0000, in embodiments. However, any value is envisaged for the last credit pocket record. By having a pointer to the Next Credit Pocket Record, this allows the Credit Pocket Records to be easily searched.

Checksum is a value to detect any errors within the credit pocket record.

As noted above, the total number of bytes stored within the credit pocket records is 32. This is advantageous because the size of a typical page within a memory is a multiple of this number of bytes. Therefore, by having 32 bytes within one credit pocket record, this efficiently uses the memory. So, 100 credit pocket records would consume 3200 bytes meaning that over 700 credit pocket records could be stored on a 32K card (and around 1700 on a 64K card).

Of course, the number of bytes allocated to the variables described above in the value pocket record and credit pocket records may differ from those presented. Therefore, the skilled person would not consider the number of bytes allocated to each variable to be so limited.

Figure 4B:
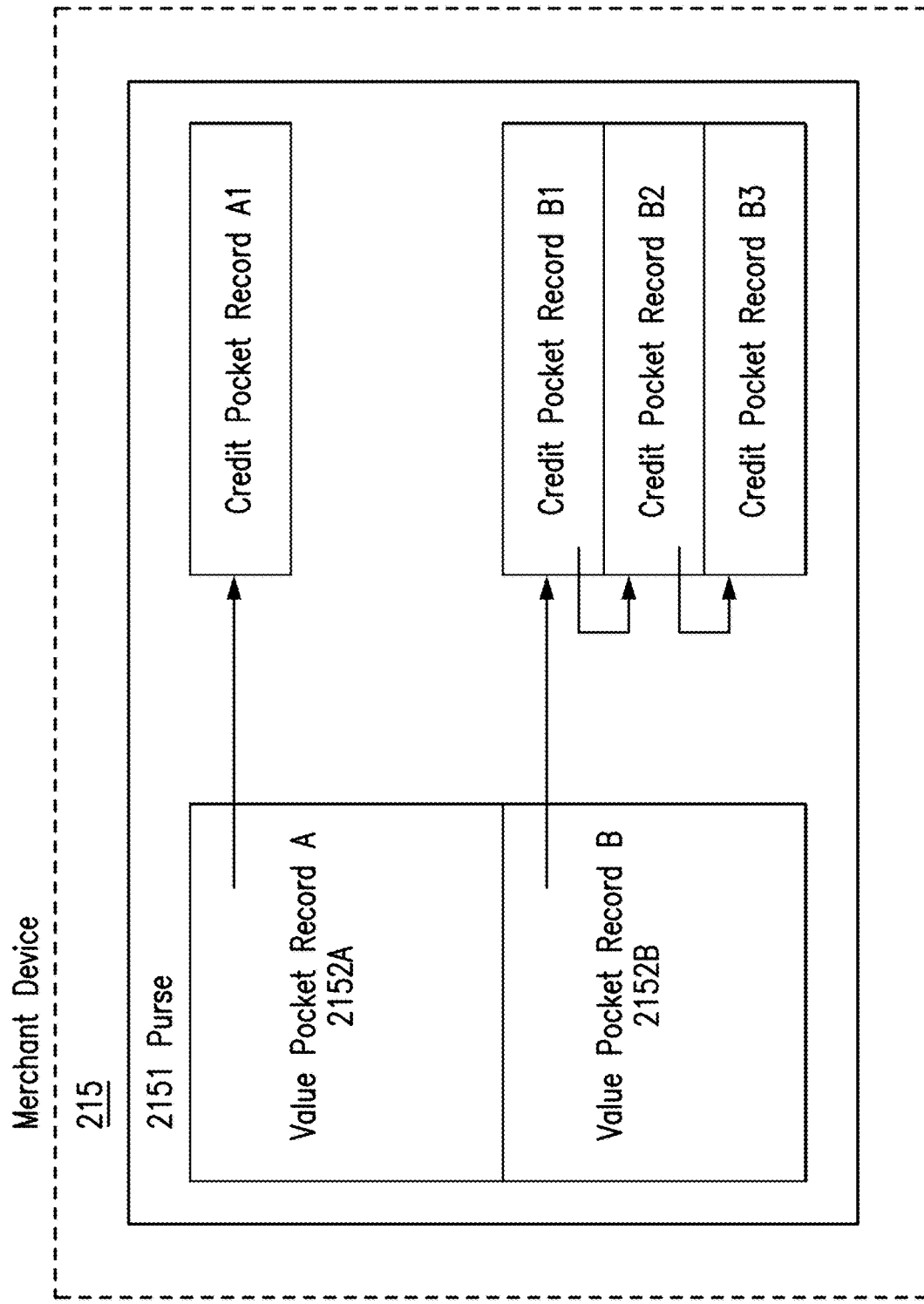
FIG. 4B shows a data structure stored within the merchant device 200 according to embodiment of the present disclosure.

FIG. 4B shows a data structure stored within merchant storage 215 according to embodiments. As will be apparent, the data structure is very similar to that described above with reference to the cardholder device 100 shown in FIG. 4A.

In the example of FIG. 4B, the purse 2151 is shown. This purse 2151 has the same features as the purse 1151 in the cardholder device 100. Accordingly, the description of purse 2151 is omitted for brevity.

In a similar manner to the storage of currency in cardholder purse 1151 described above, the merchant device purse 2151 includes a first value pocket record (Value Pocket Record A) 2152A and a second value pocket record (Value Pocket Record B) 2152B. In the example of FIG. 4B, and similar to the cardholder purse 1151 described above, these value pocket records have been allocated to US Dollar and Kenyan Shilling respectively. Of course, the disclosure is not so limited. It is not necessary for the purse 2151 of the merchant device 200 to include the same number of value pocket records as the purse 1151 of the cardholder device 100. It is also not necessary for the purse 2151 of the merchant device 200 to have exactly the same currencies as the purse 1151 of the cardholder device 100 allocated to the value pocket records. In fact, as long as there is one value pocket record allocated to the same currency, a transaction may occur.

As will be evident, Value Pocket Record A 2152A of the merchant purse 2151 has one credit pocket record (Credit Pocket Record A1) associated with it. The credit pocket records in the merchant device 200 include the same information as the credit pocket records in the cardholder device 100. Accordingly, further description of the credit pocket record is omitted.

Value Pocket Record B 2152B, on the other hand, has three credit pocket records (Credit Pocket Record B1, Credit Pocket Record B2 and Credit Pocket Record B3) allocated to it. This means that the merchant purse 2151 has extended credit to one cardholder device 100 in US Dollars and the merchant purse 2151 has extended credit to three cardholder devices 100 in Kenyan Shillings.

Figure 5:
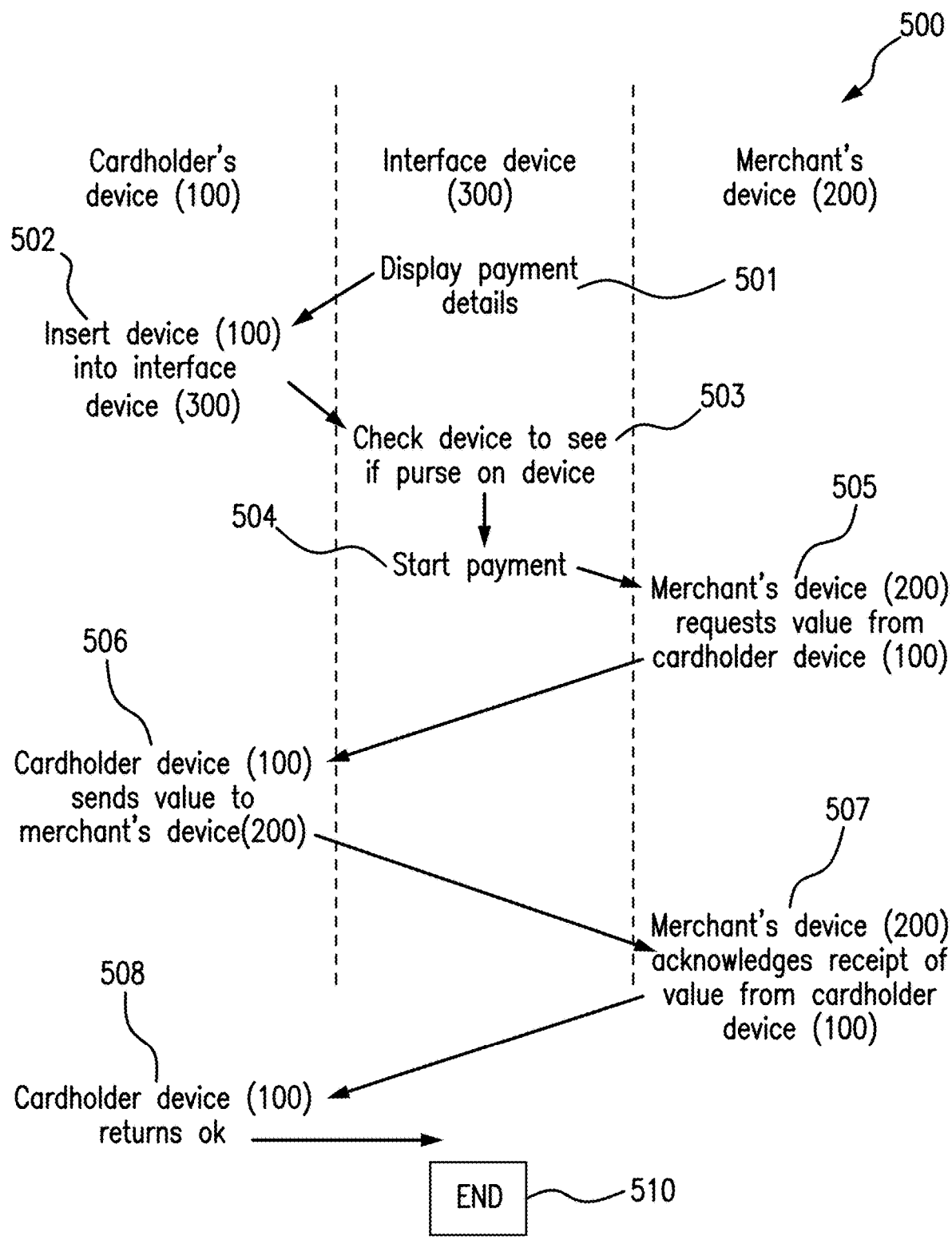
FIG. 5 shows a flow chart of signals between the cardholder device 100, merchant device 200 and the interface device according to embodiments of the present disclosure.

FIG. 5 shows a signal diagram 500 according to embodiments.

When a cardholder wishes to purchase merchandise, the interface device 300 displays the value to be provided to the merchant by the cardholder. This is step 501.

In order to indicate acceptance of the transaction, the cardholder inserts the cardholder device 100 into the interface device 300. This indicates to the interface device 300 that the cardholder accepts the transaction. This occurs at step 502.

It should be noted that there are four types of transaction that may take place.

The first is a debiting value transaction where the value of a particular currency stored in a value pocket record on the cardholder device 100 is transferred to the merchant device 200. In other words, the value of the currency stored in a value pocket record on the cardholder device 100 is reduced by the transaction amount and the value of the currency stored in a value pocket record on the merchant device 200 is increased by the transaction amount. This typically occurs when a cardholder (the user of the cardholder device 100) purchases good and/or services from a merchant (the user of the merchant device 200). This type of transaction uses the value pocket records.

The second is a crediting value transaction where the value of a particular currency stored in a value pocket record on the merchant device 200 is transferred to the cardholder device 100. In other words, the value of the currency stored in the value pocket record on the merchant device 200 is reduced by the transaction amount and the value of the currency stored in the value pocket record on the cardholder device 100 is increased by the transaction amount. This typically occurs when a cardholder (the user of the cardholder device 100) receives a refund for goods and/or services from a merchant (the user of the merchant device 200). This type of transaction uses the value pocket records.

The third type of transaction is a debiting credit transaction which is used in cases where the customer does not want to transact using the value pocket records, or has insufficient value, when they may instead seek credit from the merchant. In this type of transaction, the merchant device 200 provides credit (i.e. extends a credit facility) to the cardholder device 100 and the identities of who has received the credit and who has extended the credit and the amount of the credit are recorded on the two devices. In other words, the value of the balance stored within a credit pocket record of the cardholder device 100 that contains the identity of the merchant device 200 is decreased by the amount of the transaction provided under the credit facility and the balance value stored within the credit pocket record of the merchant device 200 that contains the identity of the cardholder device 100 is increased by the amount of the transaction provided under the credit facility. The amount of money stored within the value pocket records of the purses (i.e. the balance values in the Value Pocket Records), however, remains the same. The Total Credit Received Balance and Total Credit Provided Balance stored within the value pocket records of the purses are updated to reflect the amount of the transaction.

The fourth type of transaction is a crediting credit transaction where outstanding debt is reduced as a consequence of the exchange of value with the entity that extended the credit. In this type of transaction, the relevant credit pocket records of the devices are changed to reflect the amount of the redemption; the cardholder device 100 may redeem part or all of a credit facility previously recorded on the cardholder device 100 by the merchant device 200. In other words, the balance stored within the credit pocket record of the cardholder device 100 that contains the identity of the merchant device 200, which is negative when in debt, is increased by the amount of the transaction that being the amount returned to the merchant. In other words, the balance value in the credit pocket record is increased by the amount of the transaction as some of the credit has been repaid. The repayment of the debt may be enacted by the exchange of some tangible quantity e.g. conventional currency or barter. Equally the repayment of the debt may be enacted by transaction of the first type where, the amount of value stored in a value pocket record of the cardholder device 100 is decreased by the amount of the transaction.

The balance stored within the credit pocket record of the merchant device 200 that contains the identity of the cardholder device 100 is decreased by the amount of the repayment. If the repayment was by conventional currency or barter rather than a transaction of the first type then the amount of money stored within the value pocket record of the merchant device 200 remains the same. In other words, the balance value of the value pocket record remains the same. The Total Credit Received Balance and Total Credit Provided Balance stored within the value pocket records of the purses are updated to reflect the amount of the transaction.

Obviously if repayment is made using a transaction of the first type then the cardholder and merchant device value pocket records will change accordingly.

It should be noted that a debiting value transaction for one purse is a crediting value transaction for the counterparty purse and a debiting credit transaction for one purse is a crediting credit transaction for the counterparty purse.

Returning to FIG. 5, the interface device 300 checks the cardholder device 100 to confirm that the cardholder device 100 is a compatible device. This is performed in step 503.

Specifically, the interface device 300 issues a Purse Register and a Register Command to the cardholder device 100. The Purse Register command identifies the software and the version of the software that is run on the cardholder device 100 and which is stored in the cardholder storage 115.

In response to the Register Command, the cardholder device 100 provides configuration information about the purse stored in the cardholder storage 115 such as the number of value pocket records contained within the purse, the size of the payment and exception logs and the number of personal code attempts permitted. Other information contained in the response to the Register Command includes: current status information about the cardholder device 100 such as the current count of consecutive incorrect personal code attempts made; a character set indicator and language preferences and any other information about limitations placed on transactions such as any restrictions on the merchant with which the cardholder device 100 is allowed to transact.

Of course, although the above describes the interface device 300 checking the cardholder device 100, the disclosure is not so limited. In some instances, the interface device 300 may additionally check the merchant device 200 to ensure that the merchant device 200 is compatible with the cardholder device 100 and has the capability to accept value from the cardholder device 100.

The process then moves to step 504 where the transaction is started.

In step 504, each purse is sent a Payment Register command to obtain information about the purse, which will in embodiments include the purse identifier and the purse narrative of the purse, and then two types of Payment Start Commands are issued by the interface device 300; the Payment Start Payer Command and the Payment Start Payee Command.

The Payment Start Payer Command is sent to the cardholder device 100. The Payment Start Payer Command provides the purse 1151 within the cardholder device 100 with details of the amount, currency and purse 2151 within the merchant device 200. This will in embodiments include the purse identifier and the purse narrative of the purse 2151.

In embodiments of the disclosure, the Payment Start Payer Command also indicates whether the transaction is a debiting value transaction or a debiting credit transaction. The amount of such transaction may also be provided. In other words, in embodiments of the disclosure, the Payment Start Payer Command tells the cardholder device 100 whether the amount of the transaction will be debiting value or debiting credit value.

This indication is provided, in embodiments, by defining a direction byte at the start of the Payment Start Payer Command. For example, the direction byte may be set to 0x01 for a debiting value transaction or 0x81 for a debiting credit transaction.

In the event that the transaction is a debiting value transaction, the cardholder device 100 then checks for example, that there is a value pocket record for the currency and that the value pocket record contains a sufficient balance value and that the purse is allowed to transfer value to the merchant device 200. This information is provided in the balance variable and the Class List variable within the Value Pocket Record of the purse within the cardholder device 100.

In the event that the transaction is a debiting credit transaction i.e. where credit is being extended to the payer, the credit pocket record is used. The cardholder device 100 checks that a Credit Pocket Record for the transaction currency has been established in the purse for the purse identifier provided by the merchant device 200. This is achieved by checking the purse identifier received from the merchant device 200 against the counterparty PID stored in each credit pocket record associated with the value pocket record corresponding to the transaction currency.

In the event that no credit pocket record is found that is associated with the value pocket record of the transaction currency which includes the counterparty purse identifier, a new credit pocket record is allocated within the purse that includes the purse identifier and the purse narrative of the merchant device 200 and this is associated with the value pocket record of the transaction currency.

In the event that a credit pocket record is found that is associated with the value pocket record of the transaction currency which includes the counterparty purse identifier, the balance and narrative contained in that credit pocket record will be updated.

In the event that no credit pocket record is found that is associated with the value pocket record of the transaction currency and there is no memory available to allocate a credit pocket record, an error is returned to the interface device 300. The purse may maintain a list of unallocated credit pocket records within previously allocated memory to enable them to be allocated efficiently without needing to dynamically allocate new memory.

It is sometimes useful to avoid dynamically allocating memory. This is because to dynamically allocate and deallocate memory may be slow or not supported. As an alternative, it is possible to allocate a fixed quantity of memory for the storage of credit pocket records and to fill that memory with records that are not yet allocated to any currency or Purse ID. These unallocated records can then be allocated as needed efficiently without allocating any new memory. When no longer required, a record can be added back to the list of unallocated records rather than dynamically deallocating the memory.

If a credit pocket record is available the cardholder device 100 then, in some embodiments, checks that no credit limit attributed to the cardholder is exceeded by reference to the credit limit for an individual counterparty or the credit limit for the total for all counterparties that are defined in the value pocket record for the transaction currency. In other embodiments the credit limits could be maintained and checked by the interface device 300.

The Payment Start Payee Command is sent to the merchant device 200. The Payment Start Payee Command provides the merchant device 200 with the type of transaction, such as whether the transaction is a crediting value transaction (increasing the value stored in a value pocket record) or a crediting credit transaction (reducing the amount owed as recorded in the relevant credit pocket record) and the amount of such transaction. In addition, the currency of the transfer and the details of the purse within the cardholder device 100, such as purse identifier and purse narrative are provided to the merchant device 200. These are similar to those provided to the cardholder device 100 as explained above.

The indication of the type of transaction is provided, in embodiments, by defining a direction byte at the start of the Payment Start Payee Command. For example, the direction byte may be set to 0x00 for a crediting value transaction or 0x80 for a crediting credit transaction.

In the event that the transaction is a crediting value transaction, the merchant device 200 then checks for example, that there is a value pocket record for the currency and that the Value Pocket Record will not exceed the value limit and that the purse is allowed to receive value from the cardholder device 100.

In the event that the transaction is a crediting credit transaction, the credit pocket record is used. The merchant device 200 checks that a Credit Pocket Record for the transaction currency has been established in the purse for the purse identifier provided by the cardholder device 100. This is achieved by checking the purse identifier received from the cardholder device 100 against the counterparty PID stored in each credit pocket record associated with the value pocket record corresponding to the transaction currency.

In the event that no credit pocket record is found that is associated with the value pocket record of the transaction currency which includes the counterparty purse identifier, a new credit pocket record is allocated within the purse that includes the purse identifier and the purse narrative of the cardholder device 100 and this is associated with the value pocket record of the transaction currency.

In the event that a credit pocket record is found that is associated with the value pocket record of the transaction currency which includes the counterparty purse identifier, the balance and narrative contained in that credit pocket record will be updated.

The merchant device 200 then, in some embodiments, checks that no credit limit attributed to the merchant is exceeded by reference to the credit limit for an individual counterparty or the credit limit for the total for all counterparties that are defined in the value pocket record for the transaction currency. There may be four limits. The first is the maximum credit that can be received from an individual. The second is the maximum credit that can be provided to an individual. The third is the maximum credit that can be received in total and the fourth is the maximum credit that can be provided in total. One or more of these limits may be added to the value pocket record.

In other embodiments the credit limits could be maintained and checked by the interface device 300.

The process then moves to step 505.

In step 505, the merchant device 200 generates a Payment Request. The Payment Request is a request for the value of the transaction. This is received by the interface device 300 and the interface device 300 uses this response to construct a Payment Request command. The Payment Request command is sent to the cardholder device 100.

The cardholder device 100 receives the Payment Request command from the interface device 300 and deducts the transaction amount from the value pocket record or credit pocket record within the purse and in response sends a Payment Value message to the interface device 300. This is step 506. The interface device 300 uses this response to construct a Payment Value command which it sends to the merchant device 200.

The merchant device 200 responds to the Payment Value command with a Payment Acknowledgement message. This is step 507. The interface device 300 uses this response to construct a Payment Acknowledgement Command which it sends to the cardholder device 100. At this point, the merchant device 200 finalises the transfer of the amount to the balance in the value pocket record or credit pocket record within the purse stored within merchant storage 215

The cardholder device 100 responds to the Payment Acknowledgment message by sending an OK message to the interface device 300. The transmission of the OK message confirms that the transaction has been completed at the cardholder device 100. This is step 508.

So, in the example of a debiting value transaction for the cardholder device 100 and crediting value transaction for the merchant device 200, the balance within the value pocket record of the merchant device 200 is increased by the amount of the transaction and the balance within the value pocket record of the cardholder device 100 is decreased by the amount of the transaction. However, in the example of a debiting credit transaction for the cardholder device 100 and crediting credit transaction for the merchant device 200, the balance within the credit pocket record associated with the value pocket record of the transaction currency in the cardholder device 100 is decreased (becoming more negative) by the amount of the transaction and the balance within the credit pocket record associated with the value pocket record of the transaction currency within the merchant device 200 is increased (becoming more positive) by the amount of the transaction.

Similarly, in the example of a crediting credit transaction for the cardholder device 100 and debiting credit transaction for the merchant device 200, the balance within the credit pocket record associated with the value pocket record of the transaction currency of the cardholder device 100 is increased by the amount of the transaction (becoming less negative) and the balance within the credit pocket record associated with the value pocket record in the merchant device 200 is decreased (becoming less positive) by the amount of the transaction.

Those skilled in the art will realise which credit pocket record is represented by a negative number and which credit pocket record is represented by a positive number is arbitrary and that equally both credit pocket records could contain positive numbers along with an indicator flag signifying if the balance is credit or debt, or alternatively two positive balances could be stored representing the amount of credit and the amount of debt with one of the balances being zero.

In the event that the balance in a credit pocket record within either or both of the cardholder device 100 and/or the merchant device 200 becomes zero, the credit pocket record is deleted and removed from the list of credit pocket records associated with the value pocket record of the transaction currency. In other words, where the updated credit pocket record has a balance of zero, the credit pocket record is deleted. If the purse maintains a list of unallocated credit pocket records to facilitate efficient allocation this deleted credit pocket record will be added to that list of unallocated credit pocket records within the purse. The credit pocket record may then be allocated to a new transaction and associated with a value pocket record in due course. This ensures that the memory within the cardholder and/or merchant device is efficiently used.

The process ends at step 510.

These commands noted above in FIG. 5 will be described later in the section entitled "Application Layer Commands".

Value Pocket Record Management

When there is a transfer involving a new currency not currently stored in the purse, a new value pocket record will be created. In the event that the transfer is a debiting value or crediting value transaction (i.e. not extending a credit facility), the new value pocket record has the Pointer to First Credit Pocket Record variable set to 0000. However, in the event that the transfer extends a credit facility, a new Credit Pocket Record is also created. The Pointer to First Credit Pocket Record variable is then set to be the memory address of the newly created Credit Pocket Record.

In addition, on occasion and to make efficient use of storage, an existing value pocket record gets allocated to a different currency or in some other way deleted. For example, the value pocket record has a zero balance in the value pocket record and a transaction is initiated for a currency not currently stored by the purse. In this case, however, reallocation or in some other way deletion may only occur if the Total Credit Received Balance and Total Credit Provided Balance variables in the value pocket record also have a zero balance. In addition, the Pointer to the First Credit Pocket Record variable must also be set to 0000. This ensures that all credit facilities are settled before the existing value pocket record is reallocated to a different currency.

So, in the event that the balance in the value pocket record is zero and no credit pocket records are associated with the value pocket record, the value pocket record may be deleted (or in some other way reallocated) from the storage. This improves memory usage within the cardholder device 100 and the merchant device 200.

Enquiry Commands

Figure 6:
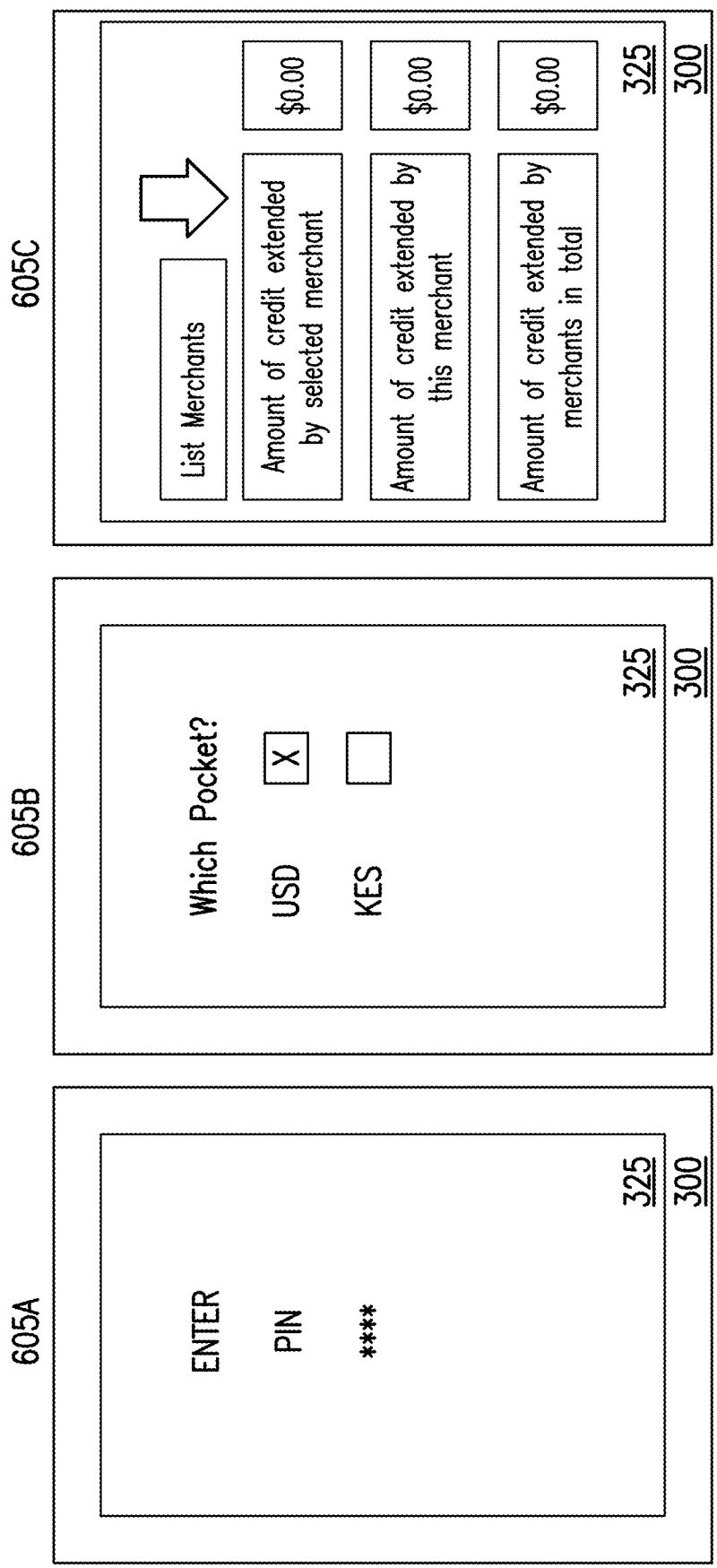
FIG. 6 shows a screen display sequence according to embodiments of the present disclosure.

In order to interrogate the Credit Pocket Records, a Credit Pocket Record Enquiry Command is required. This is required, for example, if the cardholder wishes to know with which merchants he or she has a credit facility. Embodiments of the Enquiry Commands are shown in FIG. 6 which shows a screen display sequence 600. The sequence 600 shows the information shown on a user interface display 325 on the interface device 300.

In order to perform an enquiry command, the cardholder device 100 will be presented to the interface device 300 with or without the merchant device 200 being also presented. In order to ensure security, the user may be required to insert his or her passcode. The user will insert their passcode into the interface device 300 using a keypad which is either part of the user interface 325 or attached to the interface device 300. Of course, although a passcode may be inserted, any other mechanism for validating the identity of the user is envisaged such as biometric information (for example a fingerprint or the like).

The inserted value will be compared with the "passcode" variable stored in the purse. This is shown in sequence step 605A. In this instance, the passcode is a so-called Personal Identification Number (PIN). Of course, and as noted above, any suitable authentication mechanism and means of providing the authentication is envisaged.

After successful authentication, the cardholder will be presented with options on the interface device 300 which the cardholder may select. In the sequence 600 of FIG. 6, the next option (605B) allows the user to select a value pocket record. Returning to the example of FIG. 4A, the cardholder has a value pocket record for US Dollars (Value Pocket Record A) and a value pocket record for Kenyan Shilling (Value Pocket Record B). The user selects the appropriate value pocket record. In this instance, the user highlights the appropriate value pocket record using a check mark.

The sequence then moves to step 605C where further information associated with the selected (or highlighted) value pocket record is provided to the cardholder. Firstly, the cardholder may list the merchants with which the cardholder has a credit facility along with the amount of credit extended by the merchant. In order to populate the list, the Counterparty Narrative variable for each Credit Pocket Record will be displayed. Specifically, the Counterparty Narrative will be displayed in the "List of Merchants" and the amount of credit extended by this particular merchant is displayed in the "Amount of credit extended by the selected merchant" box. As the interface device has read all the Credit Pocket Records to obtain the Counterparty Narrative variable, then the Balance variable for each Credit Pocket Record would also have been read. This reduces the number of accesses required of the Credit Pocket Record. Finally, the cardholder may display the total amount of credit extended by all the merchants. This will be displayed in the box entitled "Amount of credit extended by merchants in total".

In order to perform the enquiry commands shown in 605C, Enquiry Commands are provided according to embodiments of the disclosure. In embodiments, the Enquiry Commands interrogate the Credit Pocket Records stored in the purse 1151 within the cardholder device 100.

Specifically, each enquiry command has an instruction (INS) byte and P1 and P2 parameters according to the 7816 Series of the ISO Standards. In this case, P1 contains the value pocket record number (in this case 00 for the first value pocket record, the US Dollar value pocket record in the example above) and P2 would be used by the interface device 300 to request a cryptographically signed response from the purse 1151.

According to embodiments one of the enquiry commands takes a two byte input being an index value into the list of credit pocket records associated with the value pocket record. This input index value is set to 0001 to retrieve the first credit pocket record in the list of credit pocket records (Credit Pocket Record A1 in the above example), set to 0002 to retrieve the second credit pocket record in the list (Credit Pocket Record A2 in the above example), and set to increasing values to retrieve the subsequent credit pocket records in the list. By sending this enquiry command with incrementing index values until no more credit pocket records are found, when an error is returned, the interface device 300 can read all of the credit pocket records associated with a value pocket record. In response to each of these enquiry commands with a valid index value the Counterparty PID, Counterparty Narrative and Balance from the credit pocket record are returned. In other words, if the user in sequence step 605C selects the drop-down list, the interface device will send this enquiry command with incrementing index values starting from 0001 to the cardholder device 100 and display on the screen the Counterparty Narrative and Balance of each credit pocket record returned in the responses; the Counterparty Narrative being displayed in the drop-down and the Balance of each credit pocket record being displayed in the "Amount of credit extended by the selected merchant" box. In embodiments, if the index value input to the enquiry command is 0000 then the Total Credit Received Balance and Total Credit Provided Balance variables from the Value Pocket Record are returned in the response.

According to embodiments one of the enquiry commands takes an 8 byte input being the counterparty PID of the required credit pocket record and the Counterparty Counterparty Narrative and the Balance from the corresponding Credit Pocket Record will be returned in the response if the record exists or an error if it is not found. In other words, the interface device 300 can use the purse identifier of merchant device 200 to determine the content of the 8 byte input of the enquiry command to send to the cardholder device 100 and display the Balance contained in the corresponding response from the cardholder device 100 in an "Amount of credit extended by this merchant" box. Alternatively, or additionally, the interface device 300 can use the purse identifier of the cardholder device 100 as the input to the enquiry command to send to the merchant device 200 to obtain the Balance from the Credit Pocket Record stored in merchant purse 2151. In embodiments, if the counterparty PID input to the enquiry command is zeros (0000000000000000) then the Total Credit Received Balance and Total Credit Provided Balance variables from the Value Pocket Record are returned in the response.

In embodiments, in order to display the total credit extended by the merchants, the data input to the enquiry command may be set to a value of all zeros, in which case the enquiry command will return the Total Credit Received Balance and Total Credit Provided Balance variables for the value pocket record will be returned and displayed to the user.

Of course, other Enquiry Commands are envisaged.

Purse Provider Commands

In order to allow the management of credit pocket records, Purse Provider Commands are required. In embodiments, it is envisaged that the Purse Provider Command will at least allow the deletion of a Credit Pocket Record a particular Counterparty PID. This may be required if the merchant loses the merchant device 200 and a replacement merchant device 200 has been provided.

In order to achieve this, the P1 instruction part of the ISO 7816 Series Purse Provider Command will contain the Value Pocket Record number (00 for the first value pocket record, the US Dollar value pocket record in the example above) and the data field of the Purse Provider Command will contain a Counterparty PID of the Credit Pocket Record to be deleted and a supercode. As the skilled person appreciates, a supercode is a term of Art which is effectively a one-time numeric passcode that is cryptographically generated by the managing authority and verified to be authentic by the purse.

After successful validation of the supercode, the Credit Pocket Record corresponding to the Counterparty PID would be deleted from the list of Credit Pocket Records of the specified value pocket record. In this instance, the Total Credit Received Balance and Total Credit Provided Balance in the value pocket record need updating and the linked list of credit pocket records associated with the value pocket record needs updating by changing the Pointer to First Credit Pocket Record in the Value Pocket Record if the credit pocket record being deleted was the first in the list or changing the Pointer to the Next Credit Pocket Record in one of the Credit Pocket Records in the list if the credit pocket record being deleted was not the first in the list. If the purse maintains a list of unallocated credit pocket records to facilitate efficient allocation the deleted credit pocket record will be added to that list of unallocated credit pocket records within the purse. In the event that no credit pocket record for the Counterparty PID exists, an error is returned.

In addition to deletion of Credit Pocket Records, another Purse Provider Command may be added that allows a Credit Pocket Record to be added to the list of Credit Pocket Records. In this instance, again P1 would contain the Value Pocket Record number (00 for the first value pocket record, the US Dollar value pocket record in the example above) and the data field of the Purse Provider Command will contain a Counterparty PID, a Counterparty Narrative, a Balance and a supercode. After successful validation of the supercode, a Credit Pocket Record corresponding to the Counterparty PID will be added to the list of Credit Pocket Records associated with the specific value pocket record. Again, the Total Credit Received Balance and Total Credit Provided Balance variables of the credit pocket record will be updated accordingly or an error returned if a Credit Pocket Record already exists for the Counterparty PID or the Total Credit Received Balance or Total Credit Provided Balance would exceed the maximum possible. Moreover, the Pointer to the First Credit Pocket Record in the Value Pocket Record or the Pointer to the Next Credit Pocket Record in one of the Credit Pocket Records in the list associated with the value pocket record will need updating to add the new credit pocket record to the list.

Credit Control Options

A credit control options byte is used to determine if crediting/debiting credit transactions are permitted, how the class list should be applied to crediting and debiting credit transactions, and how the balance should be reported in the Answer To Reset (ATR). The bits can be applied as follows.

| b8 | b7 | b6 | b5 | b4 | b3 | b2 | b1 | |
|---|---|---|---|---|---|---|---|---|
| 1 | | | | | | | | Allow this Purse to provide a credit facility |
| 0 | | | | | | | | Don't allow this Purse to provide a credit facility |
| | 1 | | | | | | | Apply class list when providing a credit facility |
| | 0 | | | | | | | Don't apply class list when providing a credit facility |
| | | 1 | | | | | | Apply class list when repaying a credit facility |
| | | 0 | | | | | | Don't apply class list when repaying a credit facility |
| | | | 1 | | | | | Apply class list when receiving a credit facility |
| | | | 0 | | | | | Don't apply class list when receiving a credit facility |
| | | | | x | x | | | Reserved for Future Use |
| | | | | | | 0 | 0 | Report Value Pocket Record Balance in ATR |
| | | | | | | 0 | 1 | Report Credit Pocket Record Balance in ATR |
| | | | | | | 1 | 0 | Report combined Value Pocket Record Balance and Credit Pocket Record Balance in ATR |
| | | | | | | 1 | 1 | Don't report balance in ATR |

As will be appreciated, the Most Significant Bit (MSB) of the byte is labelled b8 and the Least Significant Bit (LSB) of the byte is labelled b1.

Although the above describes a smart card form factor, the disclosure is not so limited. In other embodiments, the cardholder device 100 and/or the merchant device 200 may be embodied as a smartphone with contactless payment functionality. In other words, the purse described may be embodied as software running on a smartphone and the cardholder communications circuitry and the merchant communications circuitry may be the contactless payment hardware provided by the smartphone.

Although the above describes using an interface device 300 which acts as an intermediary for the communication between the cardholder device 100 and the merchant device 200, the disclosure is not so limited. The cardholder device 100 and the merchant device 200 may communicate directly. In other words, the cardholder device 100 and the merchant device 200 may be brought into close proximity to one another and the relevant data exchanged directly without the use of an interface device 300.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Application Layer Commands

Each of the commands explained with reference to FIG. 5 contain the following elements at the application layer. The commands include: a header (composed of four bytes CLA—a class byte of a command defined in the 7816 Series of the ISO standards, INS—the instruction part of a command defined in the 7816 Series of the ISO Standards, P1 and P2—both are instruction parameters for the command defined in the 7816 Series of the ISO standards); Lc (the command data block length); a command data block; and Le (the expected response data block length). Each response includes: a response data block; and status bytes (SW1, SW2).

Details of the relevant above mentioned commands are now provided.

Payment Start Payer
Header
INS=0x50
Lengths
Lc=0x11+PRL from the register response of the merchant device 200
Le=no response data
Command Data Block Fields

| Offset | Field | Type | Description |
|---|---|---|---|
| 0x00 | Direction | Byte | Is a 0x01 for debiting value transaction. In the case of a debiting credit transaction (i.e. obtaining credit), this is a 0x81. |
| 0x01 | Value | Value | Value of the required value transfer |
| 0x07 | Currency | Currency | ISO currency code of the required value transfer |
| 0x0a | Date/time | Date/time | Current date/time, or where not available zero |
| 0x11 | Unsigned Payment | | Register response data block from the merchant device 200 |

Response Data Block Fields
There are none.
Payment Start Payee
Header
INS=0x52
Lengths
Lc=0x11+PRL from the register response of the cardholder device 100
Le=PML from the register response of the merchant device 200
Command Data Block Fields

| Offset | Field | Type | Description |
|---|---|---|---|
| 0x00 | Direction | Byte | 0x00 for a crediting value transaction. In the case of a crediting credit transaction (i.e. paying off a previous credit value), this is a 0x80. |
| 0x01 | Value | Value | Value of the required value transfer |
| 0x07 | Currency | Currency | ISO currency code of the required value transfer |
| 0x0a | Date/time | Date/time | Current date/time, or where not available zero |
| 0x11 | Unsigned Payment | | Register response data block from the cardholder device 100 |

Response Data Block Fields

| Offset | Field | Type | Description |
|---|---|---|---|
| 0x00 | Message Type | Byte | Always 0x00 for a crediting value transaction and 0x80 for a crediting credit transaction |
| 0x01 | Crypto Signature | Crypto Signature | The length of this field is given by CSL in the Register response |
| 0x01 + CSL | | | Future fields of length PML - 0x01 - CSL |

Payment Request
Header
INS=0x70

Lengths
Lc=PML
Le=PML
Command Data Block Fields
During a value transfer:

| Offset | Field | Type | Description |
|---|---|---|---|
| 0x00 | | | Payment Start Payee response data block from the counterparty purse |

Response Data Block Fields

| Offset | Field | Type | Description |
|---|---|---|---|
| 0x00 | Message Type | Byte | Always 0x01 for a debiting value transaction and 0x81 for debiting credit transaction |
| 0x01 | Crypto signature | Crypto signature | The value signature |
| 0x01 + CSL | | | Future fields of length PML-0x01-CSL |

Payment Value Command
Header
INS=0x72
Lengths
Lc=PML
Le=PML
Command Data Block Fields
During a value transfer:

| Offset | Field | Type | Description |
|---|---|---|---|
| 0x00 | | | Payment Request response data block from the Counterparty Purse |

Response Data Block Fields

| Offset | Field | Type | Description |
|---|---|---|---|
| 0x00 | Message type | Byte | Always 0x02 for a crediting value transaction and 0x82 for a crediting credit transaction |
| 0x01 | Crypto Signature | Crypto Signature | An Acknowledge signature |
| 0x01 + CSL | | | Future fields of length PML-0x01-CSL |

Payment Acknowledgement
Header
INS=0x74
Lengths
Lc=PML
Le=no response data
Command Data Block Fields

| Offset | Field | Type | Description |
|---|---|---|---|
| 0x00 | | | Payment Value response data block from the counterparty purse |

Response Data Block Fields
There are none.
Purse Register
Header
INS=0x24
Lengths
Lc=no command data
Le=0x03
Command Data Block Fields
None
Response Data Block Fields
Unsigned

| Offset | Field | Type | Description |
|---|---|---|---|
| 0x00 | Release ID | Byte | Release ID of the Purse Software - will always be BCD number |
| 0x01 | RRL | Byte | Register Response Length: the length of Register response data currently available from this purse |
| 0x02 | Purse Exhaustion Flag | Byte | Coded as 0 (=operational); 1 (=operational but nearing exhaustion) or 2 (=exhausted) |
| 0x03 | Software version identifier | Word | Reserved |

Signed

| Offset | Field | Type | Description |
|---|---|---|---|
| 0x00 | Crypto-signature | Crypto-signature | Protects the response data of the unsigned version and the Purse's PID and sequence number. |

Payment Register
Header
INS=0x54
Lengths
Lc=no command data
unsigned Le=PRL from the unsigned register response
signed Le=CSL from the unsigned register response
Command Data Block Fields
None
Response Data Block Fields
Unsigned

| Offset | Field | Type | Description |
|---|---|---|---|
| 0x00 | PID | PID | PID of this purse |
| 0x08 | Purse Class | Purse Class | Purse Class of this purse |
| 0x09 | Purse Parameters | Purse Parameters | Purse parameters of this purse |
| 0x0a | Narrative | Narrative | Narrative of this purse |
| 0x16 | Mondex Parameters | Mondex Parameters | Reserved |

-continued

| Offset | Field | Type | Description |
|---|---|---|---|
| 0x19 | Crypto key block | Crypto key block | Reserved. The length of this field is given by CKL in the Register response. CKL is 8 in Pilot purses and 0 Post-Pilot |
| 0x19 + CKL | Sequence Number | Sequence Number | Current sequence number of this purse |
| 0x21 + CKL | Narrative Continuation | Narrative Continuation | Narrative continuation of this purse |
| 0x30 + CKL | Character set indicator | Character set indicator | Indicates how IFDs should translate the narrative continuation of this Purse into displayable characters |
| 0x33 + CKL | | | Future fields of length PRL-0x33-CKL |

Signed

| Offset | Field | Type | Description |
|---|---|---|---|
| 0x00 | Crypto Signature | Crypto Signature | Protects the response data of the unsigned version and the Purse's PID and sequence number |

Register
Header
INS=0x22
Lengths
Lc=no command data
Unsigned Le=RRL
Signed Le=CSL
Command Data Block Fields
None
Response Data Block Fields
Unsigned

| Offset | Field | Type | Description |
|---|---|---|---|
| 0x00 | PID | PID | PID of this purse |
| 0x08 | Purse class | Purse Class | Purse class of this purse |
| 0x09 | Purse parameters | Purse parameters | Purse parameters of this purse |
| 0x0a | narrative | narrative | Narrative of this purse |
| 0x16 | Locking state | Byte | Coded as 1 (=non-locking), 2 (=unlocked), 4 (=locked) or 8 (=locked out) |
| 0x17 | Payment recovery flag | Byte | Coded as 0 (=no autorecovery possible), 1 (=payee recovery) or 2 (=payer recovery possible) |
| 0x18 | Replacement date | Date/Time | Replacement date of purse |
| 0x1f | PRL (byte) | Byte | Payment Register Length |
| 0x20 | PML (byte) | Byte | Payment Message Length |
| 0x21 | CSL(byte) | Byte | Crypto Length Signature |
| 0x22 | CKL | Byte | Crypto Key Block Length |
| 0x23 | Register extension flag | Byte | To be ignored |
| 0x24 | Register extension message ID | Byte | To be ignored |
| 0x25 | Register extension length | Byte | To be ignored |
| 0x26 | Number of pockets | Byte | Number of pockets in purse |
| 0x27 | Payment log capacity | Byte | Maximum number of payment log records |
| 0x28 | Exception log capacity | Byte | Maximum number of exception log records |
| 0x29 | Number of unused exceptions | Byte | Number of free slots in exception log |
| 0x2a | Pending exception flag | Byte | Coded as 0 (=no pending exception) or 1 (=pending exception present) |
| 0x2b | Maximum personal code attempts | Byte | Number of consecutive incorrect attempts the user may make to input the correct personal code |
| 0x2c | Personal code attempts made | Byte | Number of consecutive incorrect attempts the user may make to input the correct personal code |
| 0x2d | Percentage usage | Byte | |

-continued

| Offset | Field | Type | Description |
|---|---|---|---|
| 0x2e | Character set indicator | | Indicates how the narrative and narrative continuation should be translated into displayable characters |
| 0x31 | PRL(Word) | Word | See PRL above |
| 0x33 | PML(Word) | Word | See PML above |
| 0x35 | CSL(Word) | Word | See CSL above |
| 0x37 | AEL | Word | Authentication Enquiry Length |
| 0x39 | PEL | Word | Purse Enquiry Length |
| 0x3b | CAL | Word | Customisation Authorisation Signature Length |
| 0x3d | Currency list capacity | Byte | Number of currencies in the currency list of the purse |
| 0x3e | Chain sequence number | Sequence Number | Defined as follows: When purse has one or more exception log, this field is undefined When this purse has never contained any exception log records, this field is zero When the purse contains no exception log records, but previously did contain some, this field contains the most recent exception's sequence number |
| 0x46 | Barred list flag | Byte | Coded as 0 if the barred list is disabled, 1 if it is enabled |
| 0x47 | Transfer limit | Transfer Number | Maximum number of value transfers this purse can perform. |
| 0x4a | Purse provider usage field | Purse provider usage field | Data set up by provider |
| 0x58 | Language preferences | Language preferences | |
| 0x60 | NPID | Byte | Number of bytes of the PID that must match the payee PID |
| 0x61 | NNC | Byte | Number of bytes of the narrative continuation |
| 0x62 | Transfer limit ceiling | Transfer Number | Upper Limit on the transfer limit |
| 0x65 | Replacement date ceiling | Date/time | Upper Limit on the replacement date |
| 0x6c | | | Future fields of length RRL-0x6c |

Signed

| Offset | Field | Type | Description |
|---|---|---|---|
| 0x00 | Crypto signature | Crypto signature | Protects the response data of the unsigned version and the purse's PID and sequence number. |

Embodiments of the present technique can generally be described by the following numbered clauses:

1. A transaction device comprising storage configured to store a first data record that comprises first value data and a unique identifier associated with one other device; communications circuitry configured to communicate with a second device and to exchange an identifier and second value data from the second device; and control circuitry configured to compare the exchanged identifier with the unique identifier associated with the one other device and in the event of a positive comparison, the control circuitry is further configured to update the stored first value data in accordance with the exchanged second value data.

2. A transaction device according to clause 1, wherein the first value data is a value of credit extended to the device from the other device uniquely associated therewith.

3. A transaction device according to clause 1, wherein the storage is configured to store a plurality of data records with each data record being uniquely associated with a different device.

4. A transaction device according to clause 1, wherein storage is further configured to store a plurality of value pocket records, each value pocket record being uniquely associated with a different currency, wherein one value pocket record is associated with the stored first data record, the first data record being associated with that currency.

5. A transaction device according to clause 4, wherein the value pocket record includes a currency value indicating an amount of the currency stored in the storage, whereby in the event that the currency value in the value pocket record is zero and no first data record is associated with the value pocket record, the control circuitry is configured to delete the value pocket record from the storage.

6. A transaction device according to clause 1, wherein in the event that the updated stored first value data is zero, the control circuitry is configured to delete the first data record from the storage.

7. A transaction device according to clause 1, wherein the first data record is of the structure

| Variable | Number of Bytes |
|---|---|
| Counterparty PID | 8 |
| Counterparty Narrative | 12 |
| Balance (signed (+/−)) | 6 |
| Pointer to Next data Record (0000 if this data record is the end of the list) | 2 |
| Checksum | 4 |
| Total | 32 |

Wherein the: Counterparty PID is the purse identifier of the other party's purse involved in the transaction. Counterparty Narrative is the purse narrative of the other party's purse involved in the transaction. Balance is a positive or negative value. This is a running total of the amount of credit extended to the device by the other device. Pointer to Next data Record is a memory address value where the next data record is stored; and Checksum is a value to detect an error within the data record.

8. A transaction method comprising: storing a first data record that comprises first value data and a unique identifier associated with one other device; exchanging an identifier and second value data from a second device; and comparing the exchanged identifier with the unique identifier and in the event of a positive comparison, the method further comprises updating the stored first value data in accordance with the exchanged second value data.

9. A transaction method according to clause 8, wherein the first value data is an amount of credit extended to the device from the other device uniquely associated therewith.

10. A transaction method according to clause 8, comprising storing a plurality of data records with each data record being uniquely associated with a different device.

11. A transaction method according to clause 8, further comprising storing a plurality of value pocket records, each value pocket record being uniquely associated with a different currency, wherein one value pocket record is associated with the stored first data record, the first data record being associated with that currency.

12. A transaction method according to clause 11, wherein the value pocket record includes a currency value indicating an amount of the currency stored in the storage, whereby in the event that the currency value in value pocket record is zero and no first data record is associated with the value pocket record, the method comprises deleting the value pocket record.

13. A transaction method according to clause 8, wherein in the event that the updated stored first value is zero, the method comprises deleting the first data record.

14. A transaction method according to clause 8, wherein the first data record is of the structure

| Variable | Number of Bytes |
| --- | --- |
| Counterparty PID | 8 |
| Counterparty Narrative | 12 |
| Balance (signed (+/−)) | 6 |
| Pointer to Next data Record (0000 if this data record is the end of the list) | 2 |
| Checksum | 4 |
| Total | 32 |

Wherein the: Counterparty PID is the purse identifier of the other party's purse involved in the transaction. Counterparty Narrative is the purse narrative of the other party's purse involved in the transaction. Balance is a positive or negative value. This is a running total of the amount of credit extended to the device by the other device. Pointer to Next Data Record is a memory address value where the next data record is stored; and Checksum is a value to detect an error within the credit pocket record.

15. A computer program product comprising computer readable instructions which, when loaded onto a computer, configure the computer to perform a method according to any of clauses 8-14.

What is claimed is:

1. A transaction device comprising:
communications circuitry configured to communicate with any merchant device of a plurality of merchant devices to:
initiate a transaction with a particular merchant device of the plurality of merchant devices, wherein the transaction is a debiting credit transaction where a credit facility is extended or a crediting credit transaction where outstanding debt is reduced; and
receive an identifier associated with the particular merchant device and transaction data comprising at least a transaction amount and a transaction currency;
control circuitry configured to:
determine a corresponding credit pocket record for the transaction by:
comparing the identifier received from the particular merchant device against a unique identifier stored in each credit pocket record associated with a value pocket record corresponding to the transaction currency; and
identifying a credit pocket record having a same unique identifier as the identifier received from the particular merchant device, wherein the credit pocket record having the same unique identifier as the identifier received from the particular merchant device is the corresponding credit pocket record for the transaction;
update stored value data of the corresponding credit pocket record indicating a total amount of credit facility extended from the particular merchant device in accordance with the received transaction data; and
in an event that the updated stored value data of the corresponding credit pocket record is zero, delete the corresponding credit pocket record; and
storage configured to store a plurality of data records comprising value pocket records and associated credit pocket records, each value pocket record being uniquely associated with one currency, each credit pocket record associated with that value pocket record being uniquely associated with one merchant device of the plurality of merchant devices and comprising at least value data and a unique identifier corresponding to the uniquely associated one merchant device, the value data including at least a total amount of credit facility extended from the uniquely associated one merchant device.

2. The transaction device of claim 1, wherein each value pocket record comprises a memory pointer to a first credit pocket record, the first credit pocket record being associated with that currency.

3. The transaction device of claim 1, wherein each value pocket record comprises a total credit received balance value, a total credit provided balance value, and a pointer to a first credit pocket record associated with the value pocket record, the total credit received balance value being a total amount of credit facility extended to all associated credit pocket records, the total credit provided balance value being a total amount of credit facility provided by all associated credit pocket records, wherein the control circuitry is further configured to:
update the total credit received balance value or the total credit provided balance value in accordance with the received transaction data.

4. The transaction device of claim 1, wherein each credit pocket record further comprises a counterparty narrative having 12 bytes, a pointer to a next data record, the pointer having 2 bytes, and a checksum value having 4 bytes, wherein the unique identifier is a counterparty identifier having 8 bytes, the counterparty identifier being a purse identifier of a purse of the uniquely associated one merchant device, wherein the value data comprises a balance value having 6 bytes, the balance value being a positive value or negative value and being the total amount of credit facility extended from the uniquely associated one merchant device, wherein the counterparty narrative is a purse narrative of the purse of the uniquely associated one merchant device, wherein the pointer to next data record is a memory address value where the next credit pocket record is stored, the pointer to next data record being 0000 if a credit pocket record is a last data record, and wherein the checksum value is a value to detect an error within a credit pocket record.

5. The transaction device of claim 1, wherein the transaction is the debiting credit transaction, wherein the updating of the stored value data in accordance with the received transaction data comprises decreasing the total amount of credit facility extended from the particular merchant device by the transaction amount.

6. The transaction device of claim 1, wherein the transaction is the crediting credit transaction, wherein the updating of the stored value data in accordance with the received transaction data comprises increasing the total amount of credit facility extended from the particular merchant device by the transaction amount.

7. A transaction method comprising:

managing a plurality of data records comprising value pocket records and associated credit pocket records, each value pocket record being uniquely associated with one currency, each credit pocket record associated with that value pocket record being uniquely associated with one merchant device of a plurality of merchant devices and comprising at least value data and a unique identifier corresponding to the uniquely associated one merchant device, the value data including at least a total amount of credit facility extended from the uniquely associated one merchant device;

communicating with any merchant device of the plurality of merchant devices to:

initiate a transaction with a particular merchant device of the plurality of merchant devices, wherein the transaction is a debiting credit transaction where a credit facility is extended or a crediting credit transaction where outstanding debt is reduced; and receive an identifier associated with the particular merchant device and transaction data comprising at least a transaction amount and a transaction currency;

determine a corresponding credit pocket record for the transaction by:

comparing the identifier received from the particular merchant device against the unique identifier stored in each credit pocket record associated with the value pocket record corresponding to the transaction currency; and identifying a credit pocket record having a same unique identifier as the identifier received from the particular merchant device, wherein the credit pocket record having the same unique identifier as the identifier received from the particular merchant device is the corresponding credit pocket record for the transaction;

updating stored value data of the corresponding credit pocket record indicating a total amount of credit facility extended from the particular merchant device in accordance with the received transaction data; and deleting the corresponding credit pocket record when the updated stored value data of the corresponding credit pocket record is zero.

8. The transaction method of claim 7, wherein each value pocket record comprises a memory pointer to a first credit pocket record, the first credit pocket record being associated with that currency.

9. The transaction method of claim 7, wherein each value pocket record comprises a total credit received balance value, a total credit provided balance value, and a pointer to a first credit pocket record associated with the value pocket record, the total credit received balance value being a total amount of credit facility extended to all associated credit pocket records, the total credit provided balance value being a total amount of credit facility provided by all associated credit pocket records, wherein the method further comprises:

updating the total credit received balance value or the total credit provided balance value in accordance with the received transaction data.

10. The transaction method of claim 7, wherein each credit pocket record further comprises a counterparty narrative having 12 bytes, a pointer to next a data record, the pointer having 2 bytes, and a checksum value having 4 bytes, wherein the unique identifier is a counterparty identifier having 8 bytes, the counterparty identifier being a purse identifier of a purse of the uniquely associated one merchant device, wherein the value data comprises a balance value having 6 bytes, the balance value being a positive value or negative value and being the total amount of credit facility extended from the uniquely associated one merchant device, wherein the counterparty narrative is a purse narrative of the purse of the uniquely associated one merchant device, wherein the pointer to next data record is a memory address value where the next credit pocket record is stored, the pointer to next data record being 0000 if a credit pocket record is a last data record, and wherein the checksum value is a value to detect an error within a credit pocket record.

11. The transaction method of claim 7, wherein the transaction is the debiting credit transaction, wherein the updating of the stored value data in accordance with the received transaction data comprises decreasing the total amount of credit facility extended from the particular merchant device by the transaction amount.

12. The transaction method of claim 7, wherein the transaction is a crediting credit transaction, wherein the updating of the stored value data in accordance with the received transaction data comprises increasing the total amount of credit facility extended from the particular merchant device by the transaction amount.

13. One or more non-transitory computer readable storage media having instructions stored thereon that, when executed by a processor, direct the processor to:

manage a plurality of data records comprising value pocket records and associated credit pocket records, each value pocket record being uniquely associated with one currency, each credit pocket record associated with that value pocket record being uniquely associated with one merchant device of a plurality of merchant devices and comprising at least value data and a unique identifier corresponding to the uniquely associated one merchant device, the value data including at least a total amount of credit facility extended from the uniquely associated one merchant device;

communicate with any merchant device of the plurality of merchant devices to:
- initiate a transaction with a particular merchant device of the plurality of merchant devices, wherein the transaction is a debiting credit transaction where a credit facility is extended or a crediting credit transaction where outstanding debt is reduced; and
- receive an identifier associated with the particular merchant device and transaction data comprising at least a transaction amount and a transaction currency;

determine a corresponding credit pocket record for the transaction by:
- comparing the identifier received from the particular merchant device against the unique identifier stored in each credit pocket record associated with the value pocket record corresponding to the transaction currency; and
- identifying a credit pocket record having a same unique identifier as the identifier received from the particular merchant device, wherein the credit pocket record having the same unique identifier as the identifier received from the particular merchant device is the corresponding credit pocket record for the transaction;

update stored value data of the corresponding credit pocket record indicating a total amount of credit facility extended from the particular merchant device in accordance with the received transaction data; and in an event that the updated stored value data of the corresponding credit pocket record is zero, delete the corresponding credit pocket record.

14. The media of claim 13, wherein each value pocket record comprises a memory pointer to a first credit pocket record, the first credit pocket record being associated with that currency.

15. The media of claim 13, wherein each value pocket record comprises a total credit received balance value, a total credit provided balance value, and a pointer to a first credit pocket record associated with the value pocket record, the total credit received balance value being a total amount of credit facility extended to all associated credit pocket records, the total credit provided balance value being a total amount of credit facility provided by all associated credit pocket records, wherein the instructions further direct the processor to:

update the total credit received balance value or the total credit provided balance value in accordance with the received transaction data.

16. The media of claim 13, wherein the transaction is the debiting credit transaction, wherein the instructions that direct the processor to update the stored value data in accordance with the received transaction data further direct the processor to:

decrease the total amount of credit facility extended from the particular merchant device by the transaction amount.

17. The media of claim 13, wherein the transaction is the crediting credit transaction, wherein the instructions that direct the processor to update the stored value data in accordance with the received transaction data further direct the processor to:

increase the total amount of credit facility extended from the particular merchant device by the transaction amount.

* * * * *